United States Patent
Wang et al.

(10) Patent No.: US 11,221,252 B2
(45) Date of Patent: Jan. 11, 2022

(54) AMBIENT LIGHT SENSOR, LIGHT TRANSMISSION ANALYSIS METHOD, AND SYSTEM THEREOF

(71) Applicants: HONGFUJIN PRECISION ELECTRONICS (ZHENGZHOU) CO., LTD., Zhengzhou (CN); HON HAI PRECISION INDUSTRY CO., LTD., New Taipei (TW)

(72) Inventors: Yi-Peng Wang, Zhengzhou (CN); Jun-Wei Zhang, Zhengzhou (CN)

(73) Assignees: HONGFUJIN PRECISION ELECTRONICS (ZHENGZHOU) CO., LTD., Zhengzhou (CN); HON HAI PRECISION INDUSTRY CO., LTD., New Taipei (TW)

( * ) Notice: Subject to any disclaimer, the term of this patent is extended or adjusted under 35 U.S.C. 154(b) by 576 days.

(21) Appl. No.: 16/195,269

(22) Filed: Nov. 19, 2018

(65) Prior Publication Data

US 2019/0391009 A1    Dec. 26, 2019

(30) Foreign Application Priority Data

Jun. 26, 2018  (CN) .......................... 201810669996.3

(51) Int. Cl.
*G01J 1/44* (2006.01)

(52) U.S. Cl.
CPC ........... *G01J 1/44* (2013.01); *G01J 2001/444* (2013.01)

(58) Field of Classification Search
CPC .............................. G01J 1/44; G01J 2001/444
See application file for complete search history.

(56) References Cited

U.S. PATENT DOCUMENTS

| 10,113,903 B1 * | 10/2018 | Patil ....................... G01J 1/0228 |
| 2003/0053062 A1 * | 3/2003 | Lauinger .................. G01J 3/462 |
| | | 356/406 |

* cited by examiner

*Primary Examiner* — Georgia Y Epps
*Assistant Examiner* — Don J Williams
(74) *Attorney, Agent, or Firm* — ScienBiziP, P.C.

(57) ABSTRACT

An electronic device includes a processor and a memory. The processor obtains a group of original specification data of an ambient light sensor, obtains a group of testing data of the ambient light sensor, combines the group of original specification data with the group of testing data to obtain a group of combined data, and analyzes the group of combined data according to a source of the plurality of data and a corresponding wavelength of the plurality of data to obtain a spectral hand table and a channel distribution table of the ambient light sensor.

18 Claims, 5 Drawing Sheets

AMBIENT LIGHT SENSOR, LIGHT TRANSMISSION ANALYSIS METHOD, AND SYSTEM THEREOF

FIELD

The subject matter herein generally relates to electronic devices, and more particularly to an ambient light sensor and a light transmission analysis method of the ambient light sensor.

BACKGROUND

Electronic devices, such as mobile phones and tablet computers, include ambient light sensors for taking photos, videos, and the like. The ambient light sensor adjusts light according to ambient light detected by the ambient light sensor. The ambient light sensor requires to be accurately calibrated during a production process thereof, which requires a lot of time and human resources.

BRIEF DESCRIPTION OF THE DRAWINGS

Implementations of the present disclosure will now be described, by way of example only, with reference to the attached figures.

DETAILED DESCRIPTION

Figure 1:
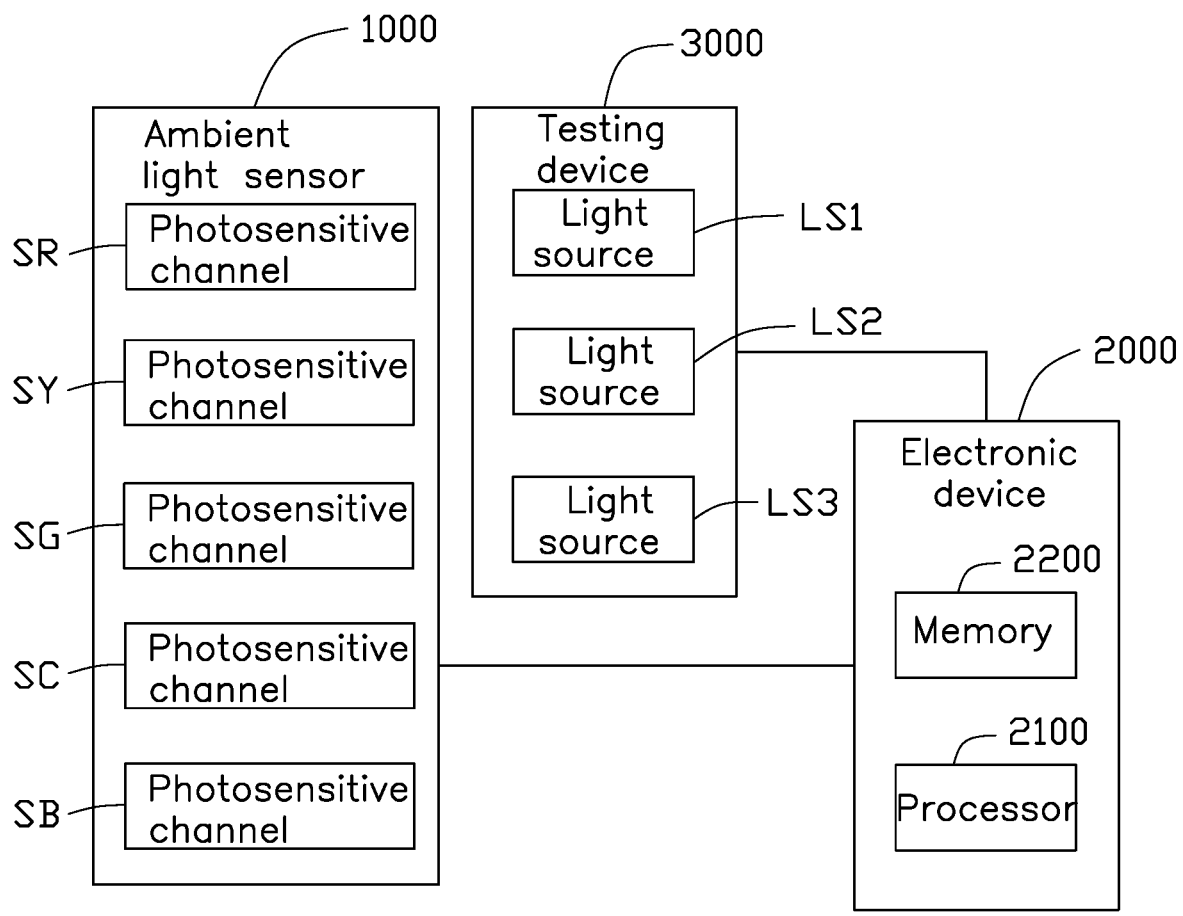
FIG. 1 is a block diagram of an embodiment of a light transmission analysis system.

It will be appreciated that for simplicity and clarity of illustration, where appropriate, reference numerals have been repeated among the different figures to indicate corresponding or analogous elements. Additionally, numerous specific details are set forth in order to provide a thorough understanding of the embodiments described herein. However, it will be understood by those of ordinary skill in the art that the embodiments described herein can be practiced without these specific details. In other instances, methods, procedures and components have not been described in detail so as not to obscure the related relevant feature being described. The drawings are not necessarily to scale and the proportions of certain parts may be exaggerated to better illustrate details and features. The description is not to be considered as limiting the scope of the embodiments described herein.

Several definitions that apply throughout this disclosure will now be presented.

The term "comprising" means "including, but not necessarily limited to"; it specifically indicates open-ended inclusion or membership in a so-described combination, group, series and the like.

FIG. 1 illustrates an embodiment of a light transmission analysis system. When an ambient light sensor 1000 proceeds to be tested, an electronic device 2000 controls a testing device 3000 to emit light onto the ambient light sensor 1000. The electronic device 2000 obtains signals output by the ambient light sensor 1000, such as detection values detected by the ambient light sensor 1000. The testing device 3000 includes one or more narrow wave width adjustable wavelength light sources, such as a light source LS1, a light source LS2, and a light source LS3. A range of wavelengths of the narrow wave width adjustable wavelength light sources is small, and a central wavelength is adjustable. For example, when the narrow wave width adjustable wavelength light source emits light having a center wavelength of 400 nanometers, a range of the light is between 390 nanometers and 410 nanometers. A systems administrator may choose narrow wave width adjustable wavelength light sources having suitable wavelengths. The electronic device 2000 includes a processor 2100 and a memory 2200. The memory 2200 stores a plurality of instructions executed by the processor 2100.

Figure 2:
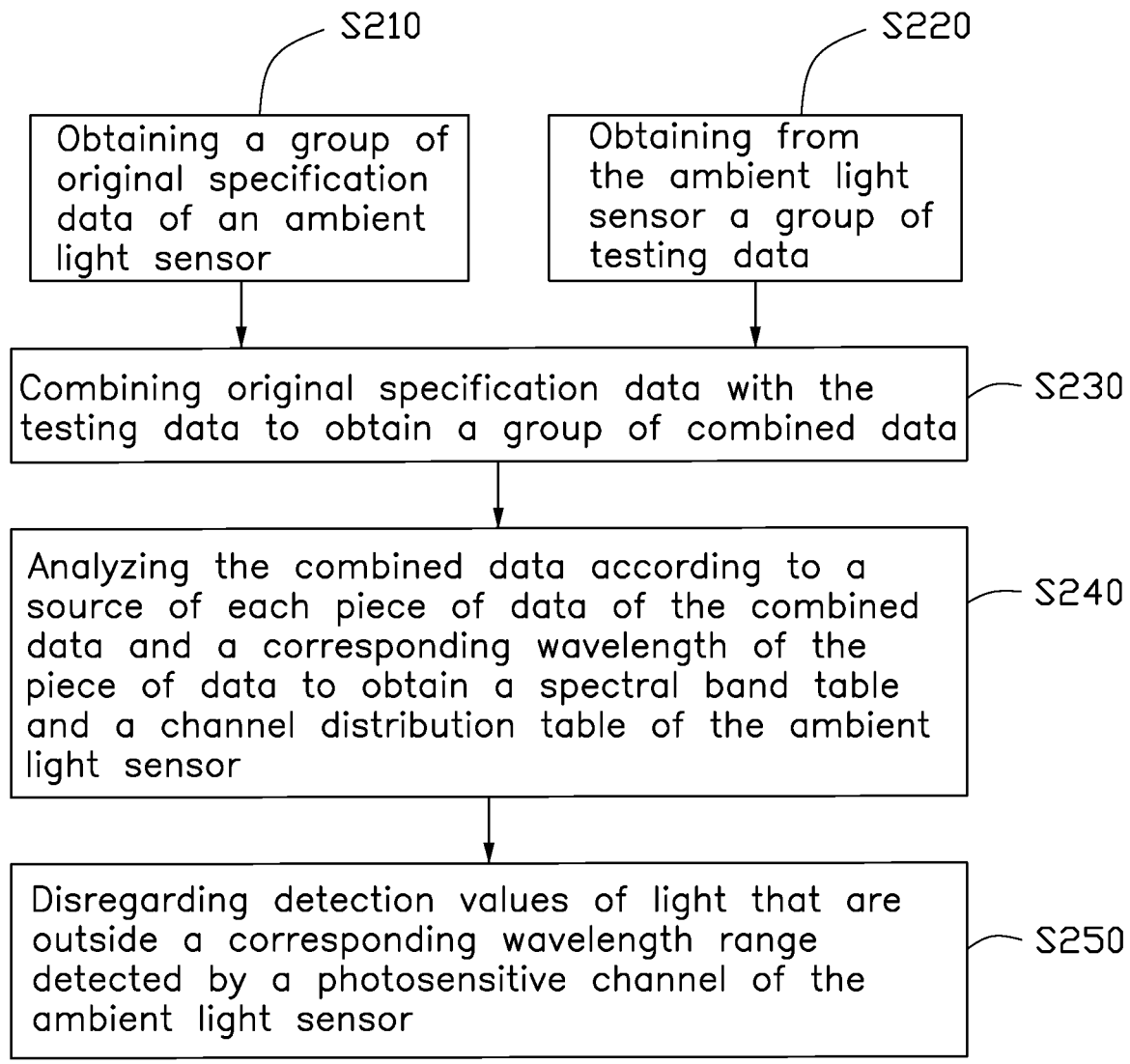
FIG. 2 is a flowchart diagram of a method of obtaining test data.

FIG. 2 illustrates a flowchart of exemplary method for obtaining test data. The example method is provided by way of example, as there are a variety of ways to carry out the method. The method described below can be carried out using the configurations illustrated in FIG. 1, for example, and various elements of these figures are referenced in explaining the example method. Each block shown in FIG. 2 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block S210.

At block S210, the electronic device 2000 obtains a group of original specification data of the ambient light sensor 1000. In detail, during a normal calibration procedure, the original specification data of the ambient light sensor 1000 is normally stored in the memory 2200 of the electronic device 2000. In another embodiment, the electronic device 2000 may be required to calibrate more than one kind of ambient light sensor 1000. Thus, the electronic device 2000 obtains the corresponding original specification data from a database (not shown). The database is a database of a manufacturer of the ambient light sensor 1000. A physical location or logic address of the database is not limited by this disclosure. In another embodiment, the electronic device 2000 is in communication with the Internet and obtains the database of the original specification data from a cloud server. In another embodiment, the database of the original specification data is stored in the memory 2200 of the electronic device 2000.

At block S220, the electronic device 2000 obtains from the ambient light sensor 1000 a group of testing data of the ambient light sensor 1000. In detail, the electronic device 2000 controls the light sources LS1, LS2, LS3 of the testing device 3000 in sequence to emit narrow wave width light multiple times onto the ambient light sensor 1000. In detail, the light source LS1 generates light having a wavelength between 400 nanometers a d 580 nm. In further detail, the light source LS1 generates light having a central wavelength of 400 nm, 430 nm, 460 nm, 490 nm, 520 nm, 550 nm, and 580 nm, and a wave width of the light is 30 nm. The light source LS2 generates light having a wavelength between 610 nm and 790 nm. The light source LS3 generates light having a wavelength between 820 nm and 1000 nm. In at least one embodiment, the testing device 3000 first controls the light source LS1 to emit light having a central wavelength of 400 nm, then controls the light source LS1 to emit light having a central wavelength of 430 nm, 460 nm, and so on, until the testing device 3000 controls the light source LS1 to emit light having a central wavelength of 580 nm. Then, the testing device 3000 controls the light source LS2 to emit light having a central wavelength of 610 nm. In other words, the testing device 3000 controls each light source to emit light of incrementally larger wavelengths. In other embodiments, the testing device 3000 controls the light sources to emit light of incrementally smaller wavelengths.

In at least one embodiment, the testing device 3000 uses the light sources LS1, LS2, and LS3 to test the ambient light sensor 1000, so that the wavelength of the light corresponding to the testing data obtained is between 400 nm and 1000 nm. In another embodiment, the testing device 3000 uses the light sources LS1 and LS2 for testing, so that the wavelength of the light corresponding to the testing data obtained is between 400 nm and 790 nm. All of the testing light is within the visible spectrum.

In at least one embodiment, each time when the electronic device 2000 controls the testing device 3000 to use one of the light sources to emit light onto the ambient light sensor 1000, the ambient light sensor 1000 detects the light, and the electronic device 2000 reads a corresponding detection value detected by the ambient light sensor 1000. The corresponding detection value is one piece of testing data. A plurality of the detection values obtained make up the plurality of testing data. Because the ambient light sensor 1000 generally includes a plurality of photosensitive channels, such as a photosensitive channel SR (red light), a photosensitive channel SC (cyan light) a photosensitive channel SG (green light), a photosensitive channel SY (yellow light), and a photosensitive channel SB (blue light), each piece of testing data includes five detection values. That is, each photosensitive channel corresponds to one detection value. In at least one embodiment, the obtained testing data is stored in the memory 2200 of the electronic device 2000. In another embodiment, the ambient light sensor 1000 is installed within the testing device 3000, and the electronic device 2000 obtains the testing data of the ambient light sensor 1000 through the testing device 3000. Blocks S210 and S220 may be performed in a synchronized manner or a sequential manner thereof.

At block S230, the electronic device 2000 combines the original specification data with the testing data to obtain a group of combined data. The group of combined data includes a plurality of data. In detail, the testing data and the original specification data obtained by the electronic device 2000 have a specific data structure. For example, one piece of testing data has the following format:

[HD][FLAG][DAT_R][DAT_Y][DAT_G][DAT_C][DAT_B][ED]

HD is a packet header, ED is a packet end, and an information packet, such as the piece of testing data, is included between HD and ED. FLAG is a flag including time information, so that a controller is able to determine, according to the time information, the wavelength of light emitted by the testing device 3000. [DAT_R], [DAT_Y], [DAT_G], [DAT_C], and [DAT_B] correspond to the five detection values of the five photosensitive channels. The data structure above is given by way of example only. The data structure in use is determined by a format of the ambient light sensor 1000.

When the electronic device 2000 obtains the original specification data, the electronic device 2000 simultaneously obtains a data format of the ambient light sensor 1000, thereby analyzing the plurality of testing data and the plurality of original specification data. For example, the original specification data places the data of SR-SB together, and each piece of testing data includes data of each photosensitive channel. In this way, the electronic device 2000 organizes all of the testing data to obtain the original factory data corresponding to the detection values detected by the photosensitive channels. For example, the original specification data includes photosensitive data of the photosensitive channel SR at each wavelength of light, the photosensitive channel SY at each wavelength of light, the photosensitive channel SG at each wavelength of light, the photosensitive channel SC at each wavelength of light, and the photosensitive channel SB at each wavelength of light. In other words, the original specification data is stored as block storage, and the electronic device 2000 stores the testing data DAT_R, DAT_Y, DAT_G, DAT_C, and DAT_B as block storage according to the corresponding photosensitive channels and arranges the original specification data of each block in sequence according to wavelength.

The electronic device 2000 obtains the set of combined data by combining the original specification data and the organized detection values of the photosensitive channels according to the description above. The original specification data and the testing data are stored in the corresponding blocks.

At block S240, the electronic device 2000 analyzes the combined data according to a source of each piece of data of the combined data and a corresponding wavelength of the piece of data to obtain a spectral band table and a channel distribution table of the ambient light sensor 1000. In detail, the electronic device 2000 determines whether the piece of data is testing data or original specification data according to whether the piece of data originates from the testing device 3000 or from the database. When the electronic device 2000 generates the group of combined data, a flag is added to each piece of data to indicate from where the piece of data originates.

In detail, the original specification data and the testing data both include a plurality of data of the photosensitive channels. The electronic device 2000 reads from the original specification data the corresponding wavelength range of each photosensitive channel. For example, the wavelength range corresponding to the photosensitive channel SR is between 500 nm and 710 nm, the wavelength range corresponding to the photosensitive channel SY is between 450 nm and 670 nm, the wavelength range corresponding to the photosensitive channel SG is between 450 nm and 620 nm, the wavelength range corresponding to the photosensitive channel SC is between 410 nm and 600 nm, and the wavelength range corresponding to the photosensitive channel SB is between 390 nm and 550 nm. Thus, the electronic device 2000 obtains the spectral band table and the channel distribution table of the ambient light sensor 1000 according to the original specification data. The spectral band table describes a sensitivity of the ambient light sensor 1000 to the light at each bandwidth. The channel distribution table defines the wavelength range corresponding to each color of light. In another embodiment, the electronic device 2000 analyzes all of the testing data, such as the detection values. For example, if the detection value of the photosensitive channel SR in the range between 490 nm and 700 nm is a non-zero value, and the photosensitive channel SR further includes a detection value at 790 nm having a non-zero value, since the photosensitive channels generally are detected continuously, the detection value at 790 nm is an outlier. Thus, it can be determined that the non-zero detection value at 790 nm is an erroneous value and should be discounted. Thus, the electronic device 2000 determines that the wavelength range of the photosensitive channel SR of the ambient light sensor 1000 is between 490 nm and 700 nm. The electronic device 2000 determines the wavelength range for each photosensitive channel according to the example described above, thereby obtaining the spectral band table and the channel distribution table. In another embodiment, the electronic device 2000 combines the original specification data and the testing data to determine the spectral band table and the channel distribution table of the ambient light sensor 1000. For example, if the original specification data defines the wavelength range of the photosensitive channel SR to be between 500 nm and 710 nm, the testing data indicates that the photosensitive channel SR detects light within the range between 490 nm and 700 nm, and a detection value at 490 nm is negligible, then the electronic device 2000 determines that the ambient light sensor 1000 detects light in the range between 500 nm and 700 nm.

At block S250, the electronic device 2000 disregards the detection values of light that is outside the range between 500 nm and 710 nm detected by the photosensitive channel SR. The other photosensitive channels are treated accordingly as described above to combine the original specification data with the testing data.

Figure 3:
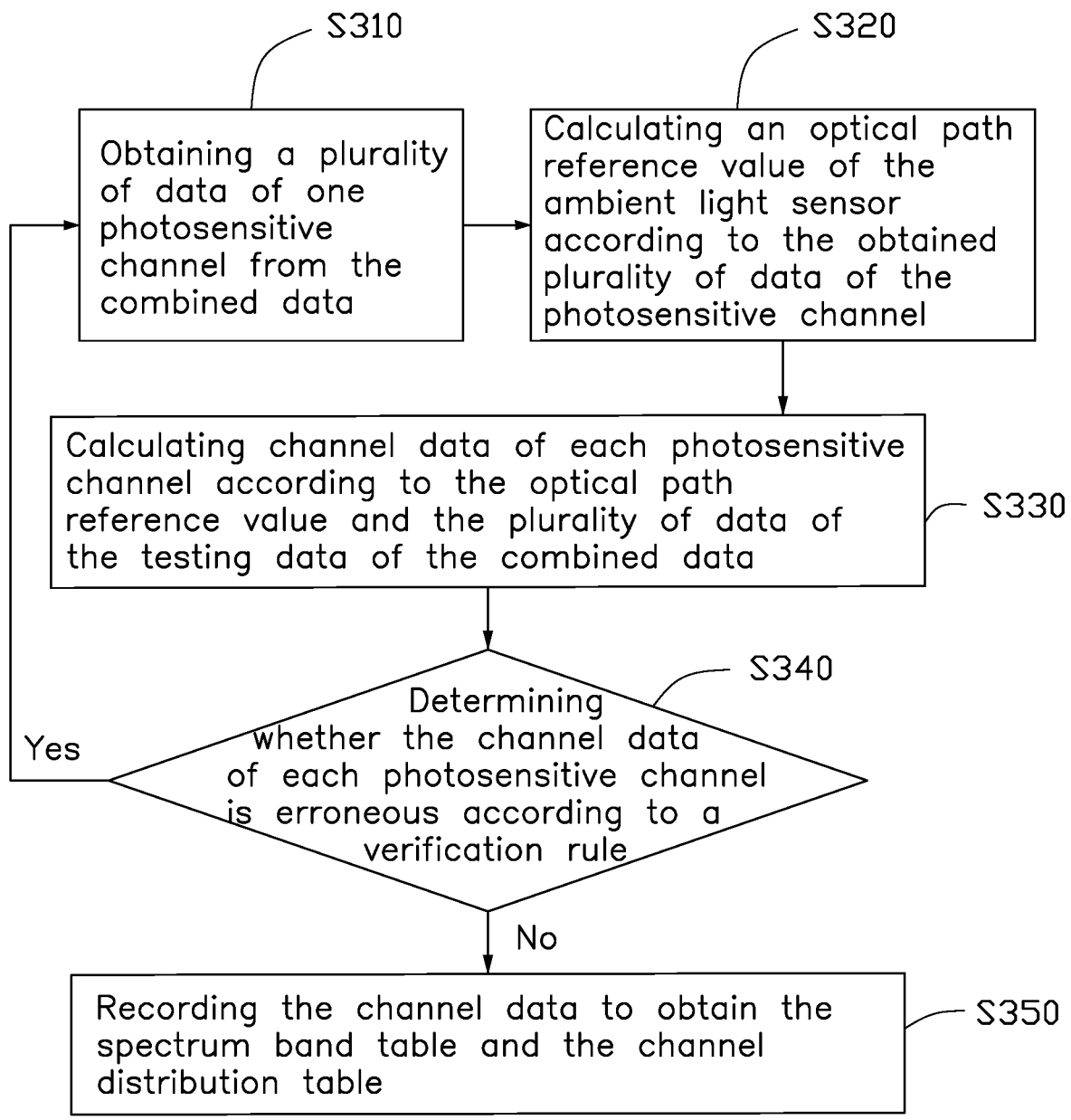
FIG. 3 is a flowchart diagram of a method of automatically processing test data.

FIG. 3 illustrates a flowchart of an exemplary method for automatically processing test data. The example method is provided by way of example, as there are a variety of ways to carry out the method. The method described below can be carried out using the configurations illustrated in FIGS. 1-2, for example, and various elements of these figures are referenced in explaining the example method. Each block shown in FIG. 3 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block S310.

At block S310, the electronic device 2000 obtains from the combined data a plurality of data of one photosensitive channel. The plurality of data originates from the group of original specification data. For example, the electronic device 2000 obtains from the combined data the original specification data of the photosensitive channel SB.

At block S320, the electronic device 2000 calculates n optical path reference value of the ambient light sensor 1000 according to the obtained plurality of data of the photosensitive channel. In detail, the original specification data includes a coefficient of a sensor of each photosensitive channel of the ambient light sensor 1000. The original specification data of the photosensitive channel SB (blue light) is multiplied by the coefficient of the sensor of the photosensitive channel SB, and then divided by the detection value of white light detected by the ambient light sensor 1000, thereby obtaining the optical path reference value. The detection value of white light is provided within the original specification data and is the detection value detected by the ambient light sensor 1000 of a predetermined white light. The predetermined white light has a color temperature of 6500K and has a predetermined intensity (lumen value).

At block S330, the electronic device 2000 calculates channel data of each photosensitive channel according to the optical path reference value and the plurality of data of the testing data of the combined data. The channel data describes a sensitivity distribution of each photosensitive channel to each wavelength of light and a corresponding color of light.

At block S340, the electronic device 2000 determines whether the channel data of each photosensitive channel is erroneous according to a verification rule. In at least one embodiment, the verification rule determines whether the channel data calculated at block S330 has an error with default channel data smaller than a predetermined threshold. If the error is less than the predetermined threshold, it is determined that the channel data is not erroneous. If the error is greater than the predetermined threshold, it is determined that the channel data is erroneous. In another embodiment, the channel data is calculated again for a second time. If the channel data calculated at both times are the same, then it is determined that the channel data is not erroneous. If the channel data calculated at both times are different, it is determined that the channel data is erroneous. When the channel data is not erroneous, block S350 is implemented. When the channel data is erroneous, block S310 is repeated.

At block S350, the electronic device 2000 records the channel data to obtain the spectrum band table and the channel distribution table.

Figure 4:
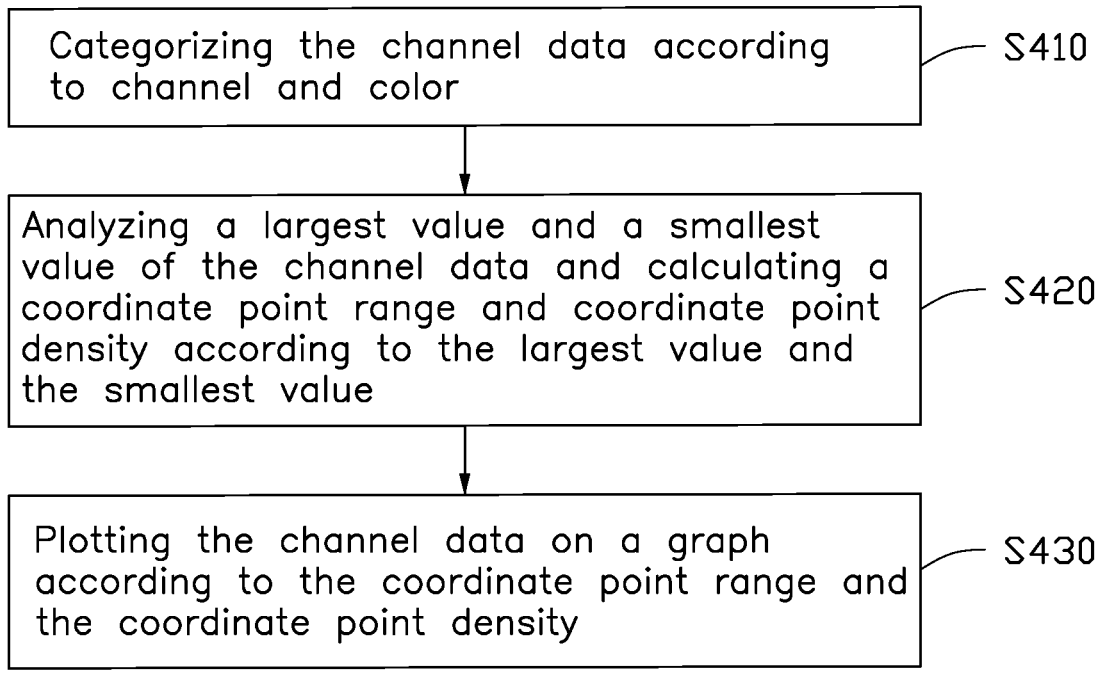
FIG. 4 is a flowchart diagram of a method of generating a spectral band table and a channel distribution table.

FIG. 4 illustrates a flowchart of an exemplary method for generating the spectral band table and the channel distribution table. The example method is provided by way of example, as there are a variety of ways to carry out the method. The method described below can be carried out using the configurations illustrated in FIGS. 1-3, for example, and various elements of these figures are referenced in explaining the example method. Each block shown in FIG. 4 represents one or more processes, methods, or subroutines carried out in the example method. Furthermore, the illustrated order of blocks is by example only, and the order of the blocks can be changed. Additional blocks can be added or fewer blocks can be utilized, without departing from this disclosure. The example method can begin at block S410.

At block S410, the electronic device 2000 categorizes the channel data according to the channel and color. For example, the photosensitive channel SB corresponds to blue light, so the channel data of the photosensitive channel SB is recorded as blue light or directly appearing as blue light at present.

At block S420, the electronic device 2000 analyzes a largest value and a smallest value of the channel data and calculates a coordinate point range and coordinate point density according to the largest value and the smallest value. In detail, since the spectral band table and the channel distribution table are displayed as a graph, it is not required to plot wavelength data with no detection values. The wavelength data with no detection values are discarded, and the coordinate point density is adjusted to more clearly display the graph.

Figure 5:
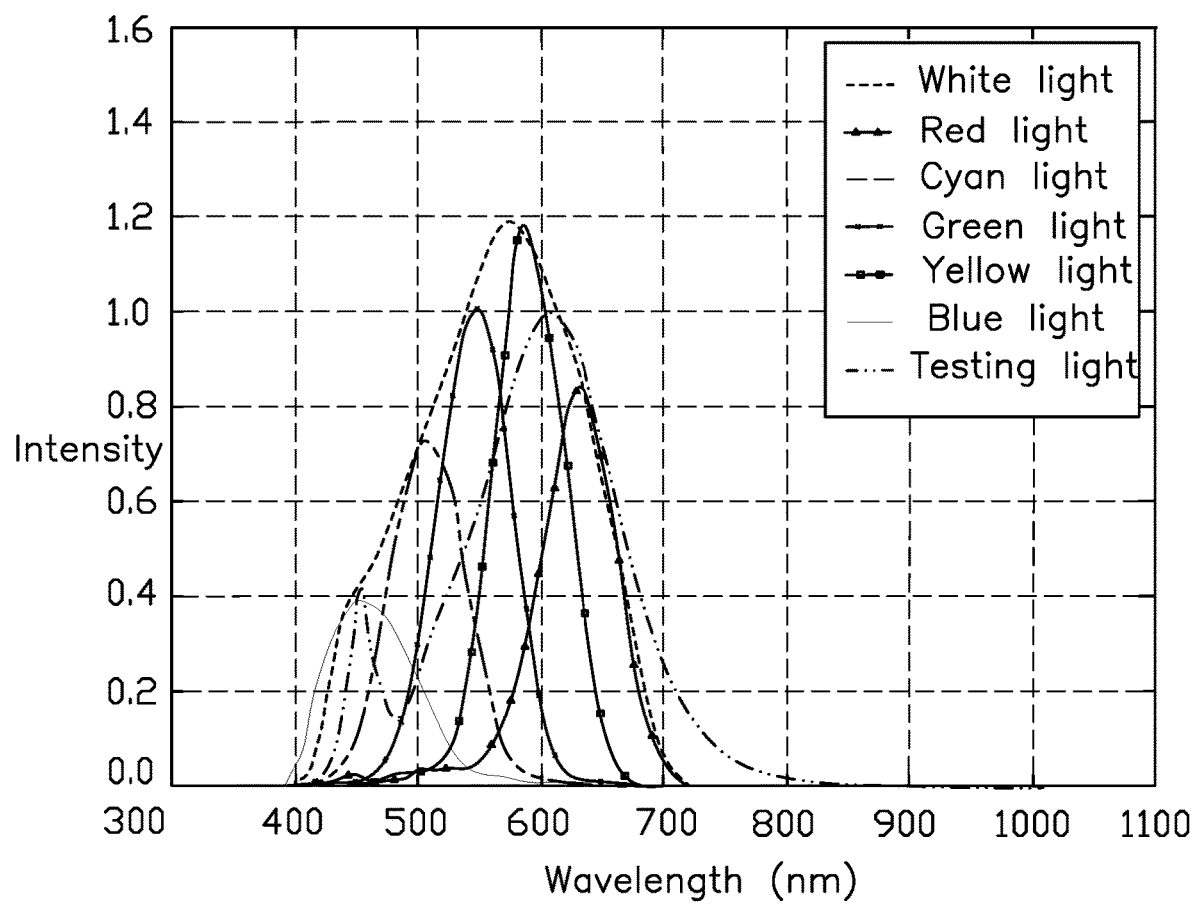
FIG. 5 is a graph showing an intensity of light verses wavelength of the photosensitive channels.

At block S430, the electronic device 2000 plots the channel data on a graph according to the coordinate point range and the coordinate point density (shown in FIG. 5). In other words, the spectral hand table and the channel distribution table are plotted on the graph with a legend. The graph includes at least one plot line corresponding to the testing data and at least one default plot line corresponding to the original specification data. In detail, the number of plot lines of testing data and the number of default plot lines are equal to the number of photosensitive channels.

As described above, one ambient light sensor 1000 corresponding to a sensitivity of light at each wavelength is established. A large quantity of testing data and original specification data are automatically correlated and converted by the electronic device 2000. Common errors encountered during processing of data are avoided. The spectral band table and the channel distribution table automatically generated and/or the corresponding graph (shown in FIG. 5) allows more convenient tuning of analysis of the ambient light sensor 1000. For example, when a user completes a final tuning, the user is able to see the graph to determine whether there are errors in the ambient light sensor 1000, such as whether there is oversensitivity or undersensitivity at a specific wavelength. In another example, when a computer automatically completes a final tuning, since the data has already been processed, categorized, and converted, the computer can directly tune the data of each photosensitive channel at each wavelength.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size and arrangement of the parts within the principles of the present disclosure up to, and including, the full extent established by the broad general meaning of the terms used in the claims.

What is claimed is:

1. A light transmission analysis method implemented in an ambient light sensor, the method comprising:
    obtaining a group of original specification data of the ambient light sensor;
    obtaining a group of testing data of the ambient light sensor from testing light onto the ambient light sensor emitted by light sources with different wavelengths;
    combining the group of original specification data with the group of testing data to obtain a group of combined data, the group of combined data comprising a plurality of data; and
    analyzing the group of combined data according to a source of the plurality of data and a corresponding wavelength of the plurality of data to obtain a spectral band table and a channel distribution table of the ambient light sensor comprising:
        obtaining, from the group of combined data, the plurality of data corresponding to one of a plurality of photosensitive channels of the ambient light sensor, the plurality of data originating from the group of original specification data; wherein each piece of testing data comprises a plurality of detection values of the plurality of photosensitive channels;
        wherein the light sources with different wavelengths define the specification data and testing data to be one in the same, the source of the plurality of data is from the group of original specification data or the group of testing data, the group of original specification data or the group of testing data both comprises a number of data of the plurality of photosensitive channels, the corresponding wavelength of the plurality of data of each photosensitive channel of the ambient light sensor is read from the original specification data.

2. The light transmission analysis method of claim 1, further comprising:
    generating a plurality of channels of the testing light in sequence to emit onto the ambient light sensor to obtain the group of testing data;
    wherein the plurality of channels of testing light are each a narrow wave width test light.

3. The light transmission analysis method of claim 2, wherein a wavelength of the plurality of channels of testing light is between 400 nanometers and 1000 nanometers.

4. The light transmission analysis method of claim 3, wherein the plurality of channels of testing light are in the visible light spectrum.

5. The light transmission analysis method of claim 1, wherein the step of analyzing the group of combined data according to a source of the plurality of data and a corresponding wavelength of the plurality of data to obtain the spectral band table and the channel distribution table of the ambient light sensor further comprises:
    calculating, according to the obtained plurality of data, an optical path reference value of the ambient light sensor.

6. The light transmission analysis method of claim 5, further comprising:
    calculating, according to the optical path reference value and the plurality of data originating from the group of testing data of the group of combined data, channel data corresponding to each photosensitive channel;
    determining, according to a calibration rule, whether the channel data has an error; and
    recording the channel data when the channel data has no error.

7. The light transmission analysis method of claim 6, further comprising:
    recalculating, according to the optical path reference value and the plurality of data originating from the group of testing data of the group of combined data, the channel parameter corresponding to each photosensitive channel when the channel data has an error.

8. The light transmission analysis method of claim 6, further comprising:
    categorizing the channel data according to each channel and color;
    analyzing a largest value and a smallest value of the channel data and calculating a coordinate point range and coordinate point density according to the largest value and the smallest value; and
    plotting the channel data on a graph according to the coordinate point range and the coordinate point density.

9. The light transmission analysis method of claim 8, wherein the graph comprises at least one plot line corresponding to the group of testing data and at least one default plot line according to the group of original specification data.

10. The electronic device of claim 2, wherein a wavelength of the plurality of channels of testing light between 400 nanometers and 1000 nanometers.

11. The electronic device of claim 10, wherein the plurality of channels of testing light are in the visible light spectrum.

12. An electronic device comprising:
    a processor; and
    a memory configured to store a plurality of instructions, when the plurality of instructions executed by the processor, cause the processor to:
        obtain a group of original specification data of the ambient light sensor;
        obtain a group of testing data of the ambient light sensor from testing light onto the ambient light sensor emitted by light sources with different wavelengths;
        combine the group of original specification data with the group of testing data to obtain a group of combined data, the group of combined data comprising a plurality of data; and
    analyze the group of combined data according to a source of the plurality of data and a corresponding wavelength of the plurality of data to obtain a spectral band table and a channel distribution table of the ambient light sensor comprising:

obtaining, from the group of combined data, the plurality of data corresponding to one of a plurality of photosensitive channels of the ambient light sensor, the plurality of data originating from the group of original specification data; wherein each piece of testing data comprises a plurality of detection values of the plurality of photosensitive channels;

wherein the light sources with different wavelengths define the specification data and testing data to be one in the same, the source of the plurality of data is from the group of original specification data or the group of testing data, the group of original specification data or the group of testing data both comprises a number of data of the plurality of photosensitive channels, the corresponding wavelength of the plurality of data of each photosensitive channel of the ambient light sensor is read from the original specification data.

13. The electronic device of claim 12, wherein the instructions further cause the processor to:

generate a plurality of channels of the testing light in sequence to emit onto the ambient light sensor to obtain the group of testing data;

wherein the plurality of channels of testing light are area a narrow wave width test light.

14. The electronic device of claim 12, wherein the instructions further cause the processor to:

calculate, according to the obtained plurality of data, an optical path reference value of the ambient light sensor.

15. The electronic device of claim 14, wherein the instructions further cause the processor to:

calculate, according to the optical path reference value and the plurality of data originating from the group of testing data of the group of combined data, channel data corresponding to each photosensitive channel;

determine, according to a calibration rule, whether the channel data has an error; and record the channel data when the channel data has no error.

16. The electronic device of claim 15, wherein the instructions further cause the processor to:

recalculate, according to the optical path reference value and the plurality of data originating from the group of testing data of the group of combined data, the channel parameter corresponding to each photosensitive channel when the channel data has an error.

17. The electronic device of claim 15, wherein the instructions further cause the processor to:

categorize the channel data according to each channel and color;

analyze a largest value and a smallest value of the channel data and calculate a coordinate point range and coordinate point density according to the largest value and the smallest value; and plot the channel data on a graph according to the coordinate point range and the coordinate point density.

18. The electronic device of claim 17, wherein the graph comprises at least one plot line corresponding to the group of testing data and at least one default plot line according to the group of original specification data.

* * * * *